United States Patent [19]

Strumbos

[11] Patent Number: 4,803,802
[45] Date of Patent: Feb. 14, 1989

[54] PLANT STAKE

[76] Inventor: William P. Strumbos, 85 Middleville Rd., Northport, N.Y. 11768

[21] Appl. No.: 637,966

[22] Filed: Aug. 6, 1984

[51] Int. Cl.⁴ ............................................. A01G 17/14
[52] U.S. Cl. ...................................................... 47/47
[58] Field of Search .............................. 47/42, 44–47, 47/7

[56] References Cited

U.S. PATENT DOCUMENTS

| 1,860,255 | 5/1932 | L'Hommedien | 47/7 |
| 3,097,079 | 7/1963 | Todd et al. | 47/41 X |
| 4,167,832 | 9/1979 | Zetterquist et al. | 47/7 X |

FOREIGN PATENT DOCUMENTS

| 508284 | 5/1929 | Fed. Rep. of Germany | 47/42 |
| 2529395 | 1/1977 | Fed. Rep. of Germany | 47/46 |
| 2822039 | 5/1979 | Fed. Rep. of Germany | 47/47 |
| 66565 | 12/1950 | Netherlands | 47/47 |
| 282275 | 4/1952 | Switzerland | 47/47 |
| 122658 | 2/1919 | United Kingdom | 47/44 |
| 1328638 | 8/1973 | United Kingdom | 47/44 |

Primary Examiner—Robert A. Hafer
Assistant Examiner—Danton D. DeMille

[57] ABSTRACT

A plant stake having an elongated stem or stock with one or more ties removably affixed to the stem along its length. In use, a length of one or more of the ties is peeled or otherwise separated from the stem, preferably before the stake is driven into the ground next to the plant being staked. When the stake is driven into place, the free end of the separated tie is used to secure the plant to the stake such that it is supported thereby.

11 Claims, 1 Drawing Sheet

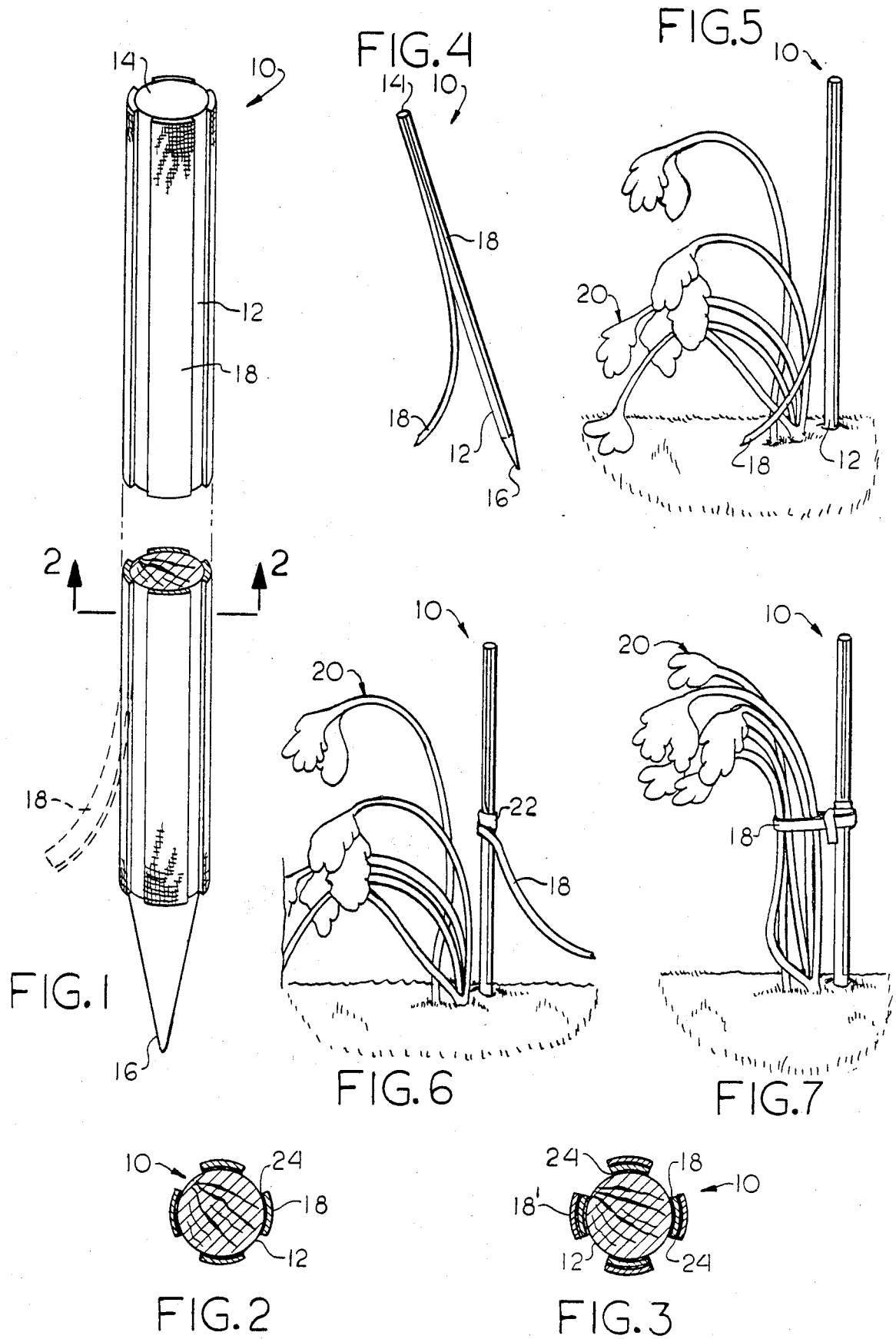

PLANT STAKE

FIELD OF THE INVENTION

This invention relates to plant stakes and, more particularly, to a plant stake provided with integral plant ties.

BACKGROUND OF THE INVENTION

It is well known in horticulture to provide wooden or metallic stakes for supporting various vegetables, flowers, and other plants during their growth or at certain stages in their life cycle when the stems are tender and liable to break. Once the stake is in the ground, twine, wire, or even strips of cloth are used to provide a tie between the plant and the stake. Inasmuch as the ties are not integral with the stakes, a common difficulty encountered by gardeners staking up plants is running out of ties. Obtaining another supply of ties not only is an inconvenience for the gardener, but it can be time consuming and can result in damage to the plant if it has to be released once it has been positioned for tying.

SUMMARY OF THE INVENTION

This invention is a plant stake comprising an elongated stem or stock having one or more ties removably fastened to the stem along its length. In use, a length of one or more of the ties is stripped or otherwise separated from the stem, preferably before one end of the stake is driven into the ground next to the plant. The free end of the separated tie is used to secure the plant to the stake such that it is supported thereby.

DESCRIPTION OF THE PRIOR ART

The prior art shows a number of disclosures of plant stakes including a simply telescoping plant stake by A. J. D'Hondt in U.S. Pat. No. 4,128,965 which uses separately provided conventional ties for securing a plant to the stake; a design by F. S. Skaug, U.S. Pat. No. 4,165,582, in which a stake having a C-formed cross-section is provided with an elongated cord-like plant tie having attachment means distributed along its length, which means are inserted into a longitudinal opening in the channel such that a plant embraced by the tie is supported; and the design taughty by C. Boucher et al, U.S. Pat. No. 4,176,494, of a plant stake of X-shaped cross-section provided with longitudinal slots running the length of the stake into which are snap-fitted semi-annular clasps holding the plant. In these prior art plant stakes, the tie means used therewith are separate elements that are not integral with the stake. There is a teaching of a plant stake provided with an integral tie in the design disclosed by W. E. Balousek in U.S. Pat. No. 2,000,911. However, in that prior art teaching, the tie is a flexible strip of material which is merely retained with the confines of the interior of the stake. In use, the tie is withdrawn from the stake and after being passed around the plant is threaded through openings along the length of the stake to secure the plant thereto. It is seen, therefore, that the prior art does not teach a simple plant stake having ribbon-like ties removably secured thereto, selected lengths of the ties being stripped away from the stake such that the free ends thereof can be passed around a plant and then tied or secured to the stake to thereby support the plant.

The invention will be better understood from the accompanying description with reference to the drawings which show the plant stake according to the invention.

DESCRIPTION OF THE DRAWINGS

For the purpose of illustrating the invention there is shown in the drawings the form which is presently preferred; it should be understood, however, that the invention is not necessarily limited to the precise arrangements and instrumentalities here shown.

FIG. 1 is a perspective view in elevation of a plant stake according to the invention;

FIG. 2 is a cross-sectional view taken along line 2—2 of the plant stake of FIG. 1;

FIG. 3 is a cross-sectional view of an alternate embodiment of the plant stake of the invention;

FIG. 4 is a perspective view in elevation of the plant stake of FIG. 1 showing a length of one of the ties stripped away from the stem of the stake;

FIG. 5 is a perspective view in elevation of the plant stake of FIG. 1 having one of its ends driven into the surface next to a plant requiring support;

FIG. 6 is a perspective view in elevation of the plant stake of FIG. 1 showing the tie readied for securing the plant; and FIG. 7 is a perspective view in elevation of the plant stake of FIG. 1 showing the plant secured to the stem of the stake by the tie.

With reference now to the drawings, FIG. 1 illustrates the plant stake 10 of the invention. Stake 10 has an elongated stem or stock 12 having an end 14, which may conveniently be called the upper end, and a second end 16, which may conveniently be called the lower end. To facilitate its being driven into the ground or other surface, lower end 16 of the stake can be pointed. A wooden stick, dowel, reed, or bamboo can be used for the stem of the stake or it can be made of a rod of metal or other suitable material. The stake has one of more ties 18 separably adhered lengthwise along the stem 12. When the stake is provided with multiple ties, they can be affixed to the stem around the circumference thereof as perhaps best shown in FIG. 2. Ties 18 are made of strips of any suitable material having a thickness consistent with the strength requirements, a width sufficient to avoid cutting into the stem of the plant being staked, and enough flexibility to permit knots if required to be tied and retained in the tie. Preferably textile tapes are used, but strips of plastic or reinforced paper, or lengths of other suitable material can be employed. To make the stake visually unobtrusive, the ties and stem can be dyed or stained green or any other appropriate color. Ties 18 can be of a length matching that of the stem such that they extend the length thereof or they can have a shorter length so that the lower end 16 of the stem is bared. To increase the number of ties available for use, multiple ties 18', as indicated in FIG. 3, can be superposed on other ties. Preferably a pressure-sensitive adhesive 24 is used to adhere the ties to the stem and to the plant (or one another) or any suitable known adhesive can be employed such that the ties are affixed securely for normal handling, but are enabled to be separated readily from the stem for use. I have had success using stakes having a stiff reed as the stems, a polyester/cotton bias tape for the ties, and an ordinary rubber cement as the adhesive affixing the ties to the stems of the stakes.

In operation, a length of each tie 18 to be used is peeled away or otherwise separated from the stem 12 from the lower end 16 thereof (FIG. 4) and the stake is driven into the ground in close proximity to the plant being staked (FIG. 5). To prevent the tie from separating completely from the stem; when a pressure-sensitive adhesive is used, a turn 22 can be taken with the tie around the stem (FIG. 6); or a half-hitch or overhand knot can be used for the purpose. It will be understood, however, that the ties can be peeled away completely from the stem such that they can be used as separate elements. As indicated in FIG. 7, a couple of turns with the tie can be taken around the plant and the stake to secure the plant thereto: the fag end of the tie can be pressed against the stake to re-adhere it if a pressure-sensitive adhesive has been used; otherwise the tie can be suitably knotted to secure the plant to the stake. The other ties can be used as desired to secure other adjacent plants to the same stake.

Although shown and described in what are believed to be the most practical and preferred embodiments, it is apparent that departures from the specific methods and apparatus described will suggest themselves to those skilled in the art and may be made without departing from the spirit and scope of the invention. I, therefore, do not wish to restrict myself to the particular instrumentalities illustrated and described, but desire to avail myself of all modifications that may fall within the compass of the appended claims.

Having thus described my invention, what I claim is:

1. A plant stake comprising: an elongated rigid stem having a first end and a second end distal therefrom, and at least a single flexible elongated plant tie removably fixed lengthwise along the length of said stem, whereby at least a predetermined length of said tie can be separated from said stem for use when an end of said stake is inserted into the ground adjacent a plant to secure said plant to said stem such that said plant is supported thereby.

2. The plant stake recited in claim 1 wherein said tie is a ribbon.

3. The plant stake recited in claim 2 wherein said ribbon is a cloth ribbon.

4. The plant stake recited in claim 2 wherein said ribbon is a paper ribbon.

5. The plant stake recited in claim 2 wherein at least a second tie ribbon is superposed on each tie ribbon.

6. The plant stake recited in claim 1 wherein said tie is removably glued to the stem.

7. The plant stake recited in claim 6 wherein said glue is a rubber cement.

8. The plant stake recited in claim 1 wherein a pressure-sensitive adhesive is used to removably fix the tie to the stem.

9. The plant stake recited in claim 1 wherein the stem is located vertically relative to the ground into which it is inserted.

10. The plant stake recited in claim 1 wherein one end of the stem is pointed to facilitate its insertion into the ground.

11. A plant stake comprising: an elongated rod-like rigid stem one end of which is inserted into the ground adjacent a plant, and an elongated flexible tie means detachably mounted lengthwise on said stem and running substantially the length thereof, at least a predetermined portion of the length of said tie means being separable from said stem for use to secure a plant thereto such that it is supported thereby.

* * * * *